May 19, 1942. W. M. MOXLEY 2,283,384
BATTERY RETAINER FOR ELECTRIC HAND LANTERNS
Filed May 8, 1941
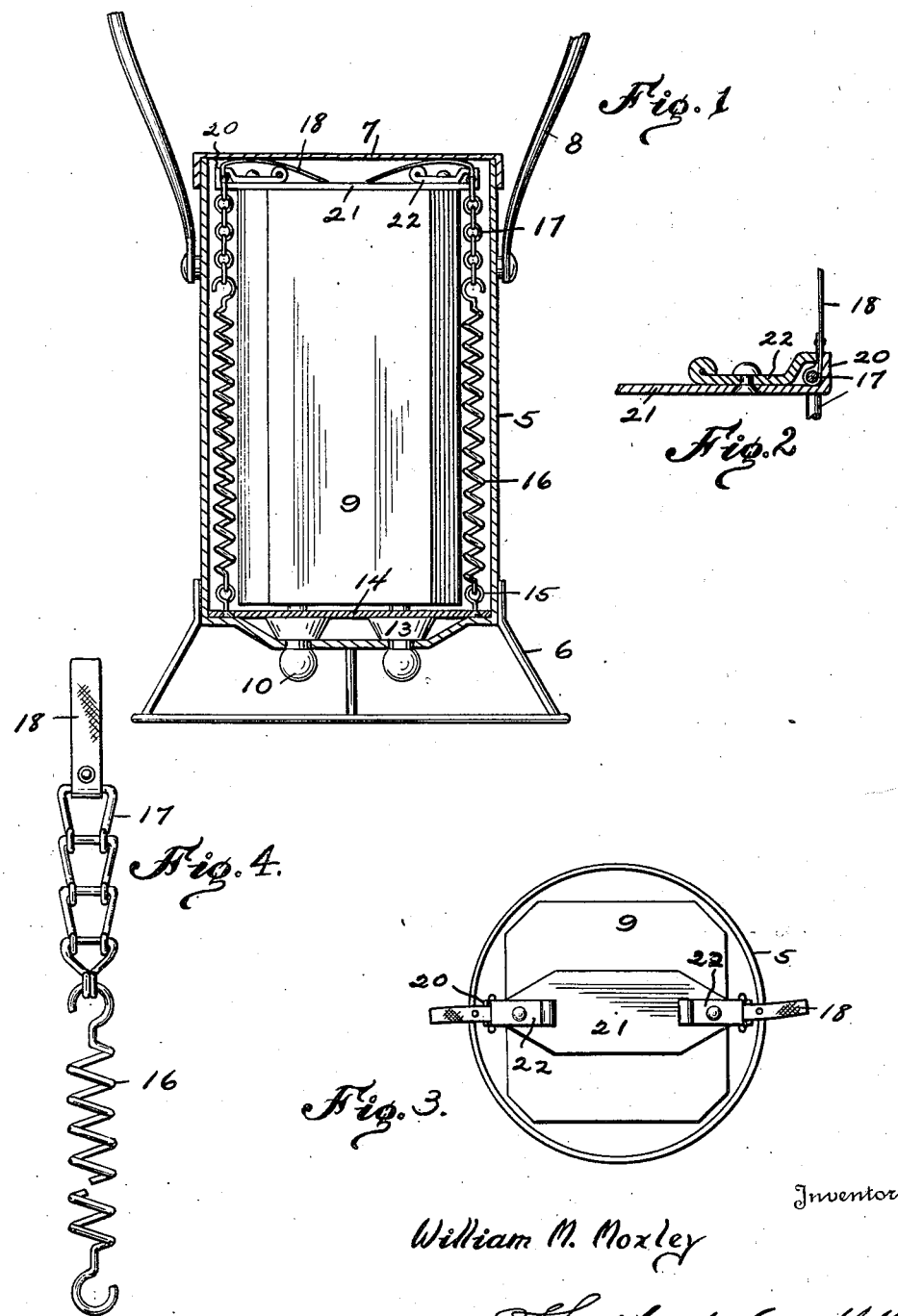
Inventor
William M. Moxley
By Shepherd & Campbell
Attorneys Patented May 19, 1942

2,283,384

UNITED STATES PATENT OFFICE 2,283,384

BATTERY RETAINER FOR ELECTRIC HAND LANTERNS

William M. Moxley, Kansas City, Mo.

Application May 8, 1941, Serial No. 392,570

6 Claims. (Cl. 240—10.63)

This invention relates to electric hand lanterns and more particularly to an improved battery retaining means for the same. Electric hand lanterns are finding wide favor among railway trainmen and are rapidly supplanting the conventional oil lantern.

The electric hand lantern is light in weight, easy to keep in order, is not subject to be blown out in high winds and made be made in such sizes as to be conveniently carried in the pocket. However, since these lanterns are used by trainmen in signaling, it follows that they must be frequently swung from a vertical to a horizontal position, or even completely inverted. Under these conditions it becomes of importance to provide reliable means for holding the battery in place and to do this independently of the cover.

In some of the earlier forms of electric hand lanterns, the battery was retained in place by a spring which exerted a thrust between the lantern cover and the battery. This necessitated the use of either troublesome fastenings for the cover, or a very tight fitting cover. These tight fitting covers proved to be very troublesome because the least rust or the least bending of the cover out of shape made it almost impossible to replace them after they had been once removed for the insertion of a new battery.

It is therefore, a primary purpose of the present invention to provide a means for retaining the battery which will be wholly independent of the cover, and through the medium of which fresh battery cells may be easily and quickly placed in position.

In the accompanying drawing:

Fig. 1 is a vertical, sectional view of the lantern constructed in accordance with the invention;

Fig. 2 is an enlarged sectional view through the upper end portion of one of the connections;

Fig. 3 is a plan view of the pressure plate and connectors, and

Fig. 4 is an enlarged face view of one of the connectors.

Like numerals designate corresponding parts throughout the several figures of the drawing.

Electric hand lanterns of the type to which this invention relates commonly comprise a body or shell 5, skeleton legs 6 constituting a base for the lantern and also a guard for the bulbs, a cover 7, a swinging bail 8, a battery of one or more cells 9 and a pair of electric bulbs 10. The sockets of these bulbs, indicated at 13, are carried by a plate 14. In carrying out the invention, I provide the plate 14 with eyes 15 to which the lower ends of tension springs 16 are attached. The upper ends of these springs are attached to the lower ends of short sections of chains, the links of which are indicated at 17.

Short sections 18 of tape may be secured to the uppermost links of the chains to provide means for drawing the chains upwardly to hook the uppermost links over the upturned hook-like ends of extensions 20 of a pressure plate 21. When thus engaged, the pressure plate is drawn by the springs toward the battery and the battery is, in turn, thrust toward the bulbs 10. Consequently, a firm electrical contact is made between battery and bulbs at all times, no matter how the lantern may be swung.

To positively insure against accidental dislodgment of the upper links of the chains from the extensions 20, buttons or latches 22 may be pivoted upon the pressure plate. When the chains are being engaged with the extensions 20, the latches 22 are turned to a position at right angles to that shown in Fig. 2, and after the chains have been so engaged, the latches are turned to the position illustrated in Fig. 2, so that their ends overlie the topmost links of the chains. It is to be understood that the invention is not limited to the precise construction set forth, but that it includes within its purview whatever changes fairly come within either the terms or the spirit of the appended claims.

Having described my invention, what I claim is:

1. In a lantern of the type embodying a two part body consisting of a shell and a cover fitted upon the end of said shell, a lamp bulb receiving socket at that end of the shell remote from the cover, a lamp bulb in said socket, a battery dimensioned to be completely housed, concealed and protected within the said body and one end of which engages with said bulb, a bodily removable pressure plate spanning the opposite end of said battery and having ends projecting outwardly beyond said battery, a pair of flexible and elastic retaining members, each detachably engaged at one of its ends with one of said ends of the pressure plate and engaged at its other end with a portion of the shell, said retaining members lying within the shell substantially throughout their length and lying between the battery and the shell.

2. A structure as recited in claim 1 in combination with retaining means carried by the pressure plate for preventing dislodgment of the flexible elements.

3. A structure as recited in claim 1 in combination with pivoted latches upon the pressure plate for locking the upper ends of the flexible members into their engagement with the pressure plate.

4. In a lantern of the type comprising a containing body having a bottom and a removable top and having means for supporting lamps bulbs in a position to be exposed at the bottom of the body, means for retaining a battery cell in engagement with said lamp body comprising a pressure plate shaped to rest upon the top of a battery cell and having portions projecting laterally beyond the sides of the battery cell, said portions having hook-like ends, chain sections, the upper links of which are adapted to engage over said hook-like extensions, springs connected to the lower ends of said chain sections, and means for securing the springs to a portion of the lantern body at a point adjacent the lower end of the battery cell.

5. A structure as recited in claim 4 in combination with flexible hand grasp members attached to the upper ends of the chain sections.

6. A structure as recited in claim 4 in combination with latches carried by the pressure plate and coacting with the hook-like ends of the extensions of the pressure plate to lock the top links of the chain sections against dislodgment.

WILLIAM M. MOXLEY.